(12) United States Patent
Huang et al.

(10) Patent No.: US 9,158,148 B2
(45) Date of Patent: Oct. 13, 2015

(54) LIQUID CRYSTAL DISPLAY PANEL AND DISPLAY DEVICE

(71) Applicants: BOE TECHNOLOGY GROUP CO., LTD., Beijing (CN); CHENGDU BOE OPTOELECTRONICS TECHNOLOGY CO., LTD., Chengdu, Sichuan Province (CN)

(72) Inventors: Li Huang, Beijing (CN); Seungyik Park, Beijing (CN); Lyulyun Hwang, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 144 days.

(21) Appl. No.: 13/957,775

(22) Filed: Aug. 2, 2013

(65) Prior Publication Data
US 2014/0036179 A1   Feb. 6, 2014

(30) Foreign Application Priority Data

Aug. 3, 2012  (CN) .......................... 2012 1 0276295

(51) Int. Cl.
  *G02F 1/1335* (2006.01)
  *G09G 3/36* (2006.01)
  *G02F 1/1337* (2006.01)

(52) U.S. Cl.
  CPC .... *G02F 1/133512* (2013.01); *G02F 1/133707* (2013.01)

(58) Field of Classification Search
  USPC .............................................. 349/106; 345/88
  See application file for complete search history.

(56) References Cited

U.S. PATENT DOCUMENTS

| | | | | |
|---|---|---|---|---|
| 6,392,728 | B2 * | 5/2002 | Tanaka et al. ................. | 349/106 |
| 6,850,290 | B1 * | 2/2005 | Song .............................. | 349/43 |
| 2005/0030449 | A1 * | 2/2005 | Kocha et al. ................... | 349/106 |
| 2006/0114378 | A1 * | 6/2006 | Choi ............................. | 349/110 |
| 2012/0327344 | A1 * | 12/2012 | Kitano et al. .................. | 349/123 |

OTHER PUBLICATIONS

First Chinese Office Action dated May 19, 2014; Appln. No. 201210276295.6.

* cited by examiner

*Primary Examiner* — Hoan C Nguyen
(74) *Attorney, Agent, or Firm* — Ladas & Parry LLP

(57) ABSTRACT

Embodiments of the invention provide a LCD panel and a display device, the LCD panel comprises an array substrate and a color filter substrate, the array substrate comprises a first transparent substrate, a data line and a pixel electrode disposed on an inner side of the first transparent substrate, the color filter substrate comprises a second transparent substrate, a color resin, a first black matrix and a common electrode overlaying the color resin and the first black matrix, wherein the first black matrix comprising a flat bottom layer and a protrusion formed on the flat bottom layer, the protrusion has slant surfaces near a boundary between the non-pixel region and the pixel region of the second transparent substrate.

10 Claims, 4 Drawing Sheets ature of the liquid crystal molecules at edges of the first black matrix is generated between the common electrode overlaying the slant surfaces and the pixel electrode.
LIQUID CRYSTAL DISPLAY PANEL AND DISPLAY DEVICE

FIELD OF THE ART

Embodiments of the invention relate to the technical field of liquid crystal displays (LCDs), more particularly, to a LCD panel and a display device.

BACKGROUND

A Thin Film Transistor Liquid Crystal Display (TFT-LCD) comprises an array substrate, a color filter substrate and a liquid crystal layer disposed between the array substrate and the color filter substrate. In the color filter substrate, pixel regions comprising color resins of three colors of red, green and blue and non-pixel regions comprising black matrices formed at gaps between the color resins of the three colors of red, green and blue are formed on the color filter substrate, and common electrodes are formed on the black matrices (non-pixel regions) and the color resins (pixel regions).

FIGS. 1 and 2 show a LCD panel fabricated by cell-assembling the color filter substrate and the array substrate. In the LCD panel, the array substrate comprises: a first transparent substrate 101, a light-shielding strip 104, a data line 102, a gate line (not shown in the figure) and a pixel electrode 103 formed on the first transparent substrate 101; the color filter substrate comprises: a second transparent substrate 201, a color resin 202, a black matrix 203 disposed at gaps between color resins and a common electrode 204 overlaying the color resin and the black matrix. Moreover, the liquid crystal layer comprising liquid crystal molecules 30 is disposed between the color filter substrate and the array substrate.

With reference to FIG. 2, in the non-pixel region of the LCD panel, there is a complicated electric field consisted of electric fields generated between the common electrode 204 on the color filter substrate and the edge of the pixel electrode 103 on the array substrate, between the common electrode 204 on the color filter substrate and the data line 102 on the array substrate, between the edge of the pixel electrode 103 on the array substrate and the data line 102 on the array substrate, between the common electrode 204 on the color filter substrate and the light-shielding strip 104 on the color filter substrate, which makes the orientation of the liquid crystal molecules 30 in the non-pixel region abnormal. Due to the presence of the black matrix 203, the black matrix can block the transmittance of the light even if the liquid crystal molecules 30 are of abnormal orientations. However, when the color filter substrate and the array substrate are misaligned, the abnormally-oriented liquid crystal molecules 30 in the non-pixel region cause different light transmittance, as a result, the first black matrix 203a parallel to the data line 102 can not block the light from the abnormally-oriented liquid crystal molecules in the non-pixel region, which may lead to pixel light leakage and reduce the picture quality of the display device.

SUMMARY

Embodiments of the invention provide a LCD panel and a display device which may solve the light leakage issue caused by the misalignment between the color filter substrate and the array substrate and improve the picture quality.

To meet the above objectives, embodiments of the invention employ the following technical solutions:

On one hand, the invention provides a LCD display comprising:

an array substrate which comprises: a first transparent substrate, a data line and a pixel electrode disposed on an inner side of the first transparent substrate;

a color filter substrate which comprises: a second transparent substrate comprising a pixel region and a non-pixel region, a color resin disposed in the pixel region, a first black matrix disposed in the non-pixel region and above the data line; and a common electrode overlaying the color resin and the first black matrix;

wherein the first black matrix comprises: a flat bottom layer and a protrusion formed on the flat bottom layer, the protrusion has slant surfaces near a boundary between the non-pixel region and the pixel region, such that an electric field for rotating liquid crystal molecules at edges of the first black matrix is generated between the common electrode overlaying the slant surfaces and the pixel electrode.

On the other hand, the invention provides a display device comprising the above LCD panel.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not imitative of the invention.

DESCRIPTION OF THE REFERENCE NUMERALS

Figure 1:
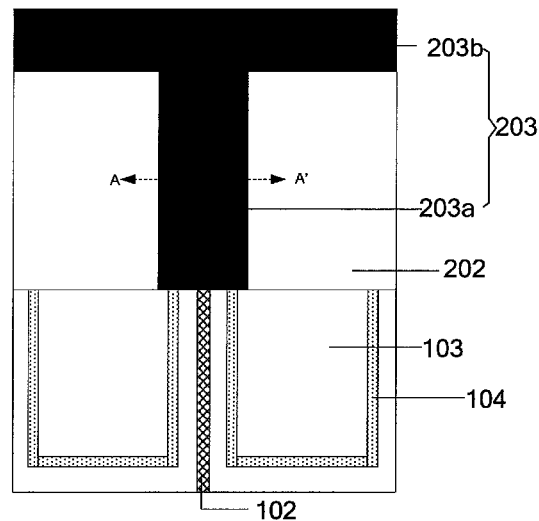
FIG. 1 schematically illustrates a top view of a display panel after cell-assembling an array substrate and a color filter substrate, in which the lower part of the figure illustrates a cut-away configuration.

10: array substrate; 20: color filter substrate; 30: liquid crystal molecules, 101: first transparent substrate; 102: data line; 103: pixel electrode; 104: light-shielding strip; 201: second transparent substrate; 202: color resin; 203: black matrix; 203a: first black matrix; 203a1: flat bottom layer; 203a: protrusion; 203b: second black matrix; 204: common electrode.

DETAILED DESCRIPTION

In order to make objects, technical details and advantages of the embodiments of the invention clear, the technical solutions of the embodiment will be described in a clearly and fully understandable way accompanying the drawings related to the embodiments of the invention. It is obvious that the described embodiments are merely a part but not all of the embodiments of the invention. Based on the described embodiments herein, those skilled in the art can obtain other embodiment(s), without any inventive work, which should be within the scope of the invention.

All the drawings of the invention are schematic views of the display and are used for the purpose of clearly describing the structures related to the inventive features; other structures irrelevant to the invention are not or only partially illustrated in the drawings.

Embodiment 1

Figure 2:
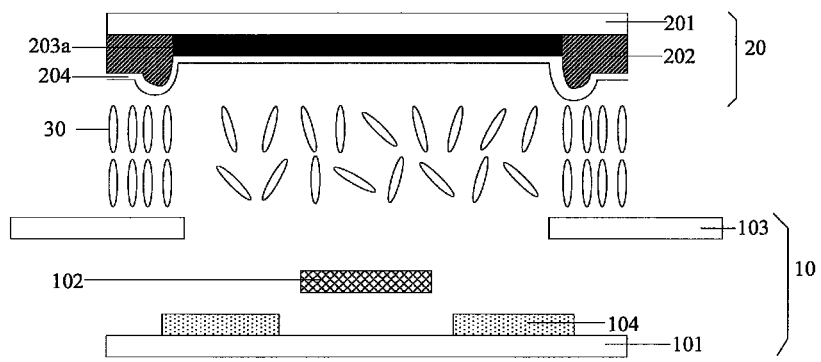
FIG. 2 schematically illustrate a cross section of a display panel after cell-assembling an array substrate and a color filter substrate.
Figure 3:
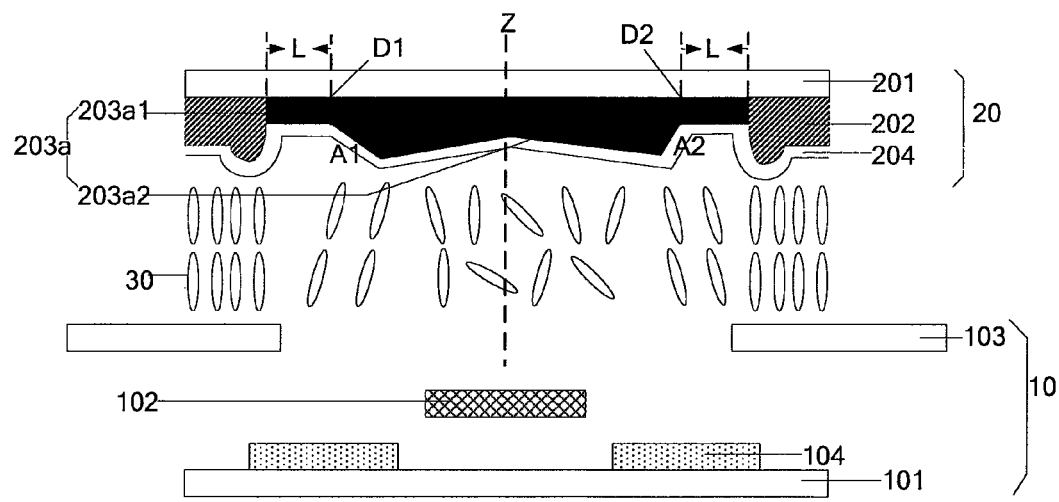
FIG. 3 schematically illustrate a cross section of a display panel after cell-assembling an array substrate and a color filter substrate provided by a first embodiment of the invention.

An embodiment of the invention provides a liquid crystal display panel shown in FIG. 3 (which is a cross section taken along the line A-A' in a way similar to FIG. 2), which comprises: an array substrate 10 and a color filter substrate 20.

The array substrate 10 comprises: a first transparent substrate 101; a data line 102 and a gate line (not shown in the figure) disposed on an inner side of the first transparent substrate 101. It may further comprises a pixel electrode 103 disposed on the inner side of the first transparent substrate 101. Moreover, it may further comprises a light-shielding strip 104 disposed on the inner side of the first transparent substrate 101. It is noted that the drawings only illustrate spatial relationships between the afore-described patterns disposed on the first transparent substrate 101 to show that the patterns are made of different film layers and no electrical connection exists between the different patterns, while patterns or film layers irrelevant to the invention are not shown in the drawings.

The color filter substrate 20 comprises: a second transparent substrate 201 comprising a pixel region and a non-pixel region; a color resin 202 disposed in the pixel region; and a first black matrix 203a disposed in the non-pixel region and above the data line 102. The color filter substrate 20 may further comprises a second black matrix 203b (not shown in FIG. 3) parallel to the gate line and a common electrode 204 overlaying the color resin 202 as well as the first and second black matrices 203a and 203b.

The first black matrix 203a comprises: a flat bottom layer 203a1 and a protrusion 203a2 formed on the flat bottom layer, wherein the protrusion 203a2 has slant surfaces A1, A2 near the boundary between the non-pixel region and the pixel region (i.e., the boundary between the first black matrix 203a and the color resin 202).

As an example, the intersection positions where the slant surfaces A1, A2 of the protrusion 203a2 near the boundary between the first black matrix 203a and the color resin 202 are conjoined with the flat bottom layer 203a1 are defined as first positions D1, D2 respectively. By this means, the slant surface A1, A2 incline from the first positions D1, D2 towards a perpendicular bisection plane Z of the first black matrix 203a, wherein the perpendicular bisection plane Z extends along the direction of the data line 102.

That is to say, the two outmost slant surfaces A1, A2 of the protrusion 203a2 incline towards the perpendicular bisection plane Z from the first positions D1, D2 respectively, thereby ensuring the common electrode 204 overlaying the first black matrix is also inclined on the two outmost slant surfaces A1, A2.

The misalignment between the color filter substrate 20 and the array substrate 10 normally causes a mismatch in the vertical direction; therefore in the embodiment of the invention, the first black matrix 203a is fabricated as the protrusion 203a2 comprising two slant surfaces A1, A2. A distance between the two slant surfaces A1, A2 and the pixel electrode 103 is relatively small, a strong electric field may be generated between the common electrode 204 overlaying the two slant surfaces A1, A2 and the pixel electrode 103 (that is, a strong electric field is generated at the boundary between the non-pixel region and the pixel region). Similar to the vertical electric field in the pixel region, the strong electric field may cause the liquid crystal molecules at the edges of the black matrix in the non-pixel region to be in the same orientation as the liquid crystal molecules in the pixel region, and suppress the effect of other miscellaneous weak electric fields on the liquid crystal molecules, thereby regulating the light passing the liquid crystal molecules at the edges of the black matrix in the non-pixel region, so as to decrease or avoid pixel light leakage.

In the above embodiment, the array substrate 10, the color resin 202 of the color filter substrate 20, and the second black matrix 203b parallel to the gate line may employ conventional structures and materials in the field, which will not be elaborated here. Furthermore, the perpendicular bisection plane Z of the first black matrix 203a extending along the direction of the data line 102 is indicated as a broken line in FIGS. 3 to 7. Moreover, since the boundary between the first black matrix 203a and the color resin 202 refers to two boundaries, the first positions in all the embodiments of the invention refer to the afore-described first positions D1, D2.

The protrusion 203a2 of the first black matrix 203a as provided by the embodiment of the invention may be a protrusion of any shape (such as a triangle or a trapezoidal) that comprises the two slant surfaces A1, A2 at the first positions D1, D2 as long as the electric field between the common electrode 204 overlaying the two slant surfaces A1, A2 of the protrusion 203a2 and the pixel electrode 103 can make the liquid crystal molecules at the edges of the first black matrix 203a in the non-pixel region to be of a similar orientation as the liquid crystal molecules in the pixel region.

In all embodiments of the invention, the slant surfaces at the first positions refer to the two slant surfaces A1, A2 at the first positions D1, D2 near the boundary between the first black matrix 203a and the color resin 202, that is, the slant surface A1 at the first position D1 and the slant surface A2 at the first position D2. Moreover, the two slant surfaces A1, A2 may have the same or different inclination angles. For example, the example shown in FIGS. 3 and 4 has two slant surfaces having different inclination angles.

In all the embodiments of the invention, the inclination angle of the slant surfaces A1, A2 are not limited, as long as the electric field between the common electrode 204 overlaying the two slant surfaces A1, A2 of the protrusion 203a2 and the pixel electrode 103 can make the liquid crystal molecules at the edges of the first black matrix 203a in the non-pixel region to be of a similar orientation as the liquid crystal molecules in the pixel region.

As an example, distance L between the first position D1, D2 and the boundary between the first black matrix 203a and the color resin 202 may be 0.9 µm~1.1 µm. For example, the distances L between the first positions D1, D2 and the boundary between the first black matrix 203a and the color resin 202 are the same and may be any value between 0.9 µm~1.1 µm. Preferably, the distance L is 1 µm.

As an example, the height of the slant surfaces A1, A2 along the direction vertical to the flat bottom layer 203a1 of the first black matrix 203a, that is, the distance from the apex of the slant surfaces A1, A2 to the flat bottom layer 203a1, may be 0.9 µm~1.1 µm. For example, the height of the slant surface A1 along the direction vertical to the flat bottom layer 203a1 of the first black matrix 203a is h1, the height of the slant surface A2 along the direction vertical to the flat bottom layer 203a1 of the first black matrix 203a is h2, both h1 and h2 may have a value between 0.9 μ~1.1 μm but different from each other. In this case, the height of the protrusion 203a2 can not exceed the maximum height of h1 and h2. Preferably, h1=h2=1 μm.

In the embodiment of the invention, the contact surface of the protrusion 203a2 and the common electrode 204, which locates between the slant surfaces A1, A2, may be slant or flat, as long as the process requirements can be met. For example, in FIG. 3 the contact surface is a slant surface, while in FIG. 5 it is a flat surface.

Embodiment 2

Figure 4:
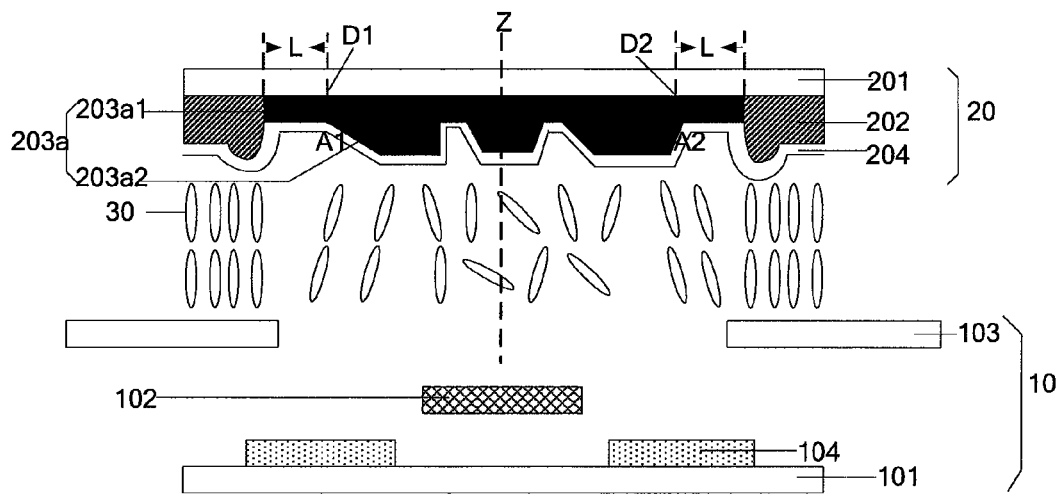
FIG. 4 schematically illustrate a cross section of a display panel after cell-assembling an array substrate and a color filter substrate provided by a second embodiment of the invention.

With reference to FIG. 4, the embodiment differs from the LCD panel of embodiment 1 in that the protrusion of the first black matrix 203a of this embodiment comprises three trapezoidal sub-protrusions, and the sizes of the three sub-protrusions are different from each other.

Embodiment 3

Figure 5:
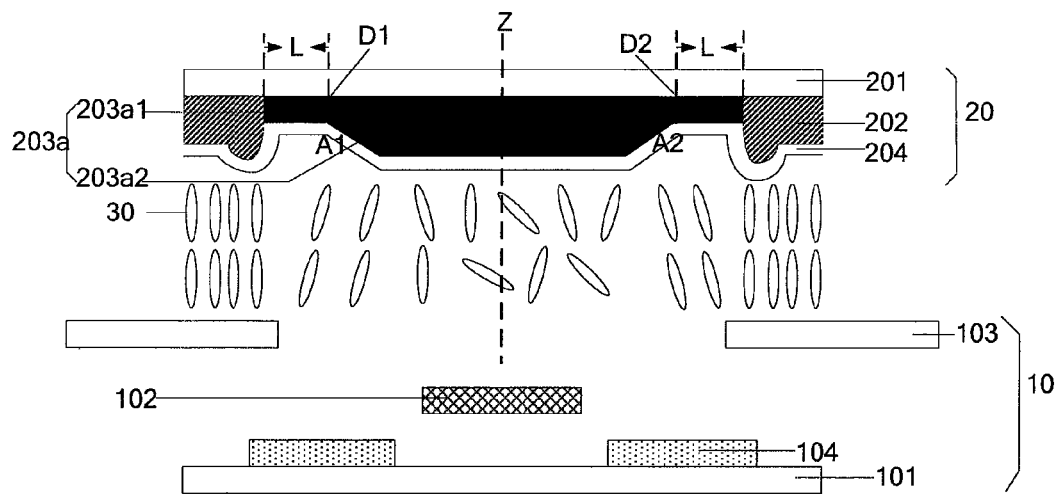
FIG. 5 schematically illustrate a cross section of a display panel after cell-assembling an array substrate and a color filter substrate provided by a third embodiment of the invention.

With reference to FIG. 5, the embodiment differs from the LCD panel of embodiment 1 in that the protrusion 203a2 of this embodiment comprises one trapezoidal sub-protrusion. Preferably, the trapezoidal sub-protrusion is symmetrical about the perpendicular bisection plane Z of the first black matrix 203a extending along the direction of data line. That is to say, the slant surfaces A1, A2 are symmetrical about the perpendicular bisection plane Z. Moreover, the bottom surface of the flat bottom layer 203a1 is also symmetrical about the perpendicular bisection plane Z. Meanwhile, the contact surface of the trapezoidal sub-protrusion and the common electrode 204, which locates between the slant surfaces A1 and A2, is a flat plane and parallel to the flat bottom layer 203a1. The contact portion, where the contact surface locates, is also symmetrical about the perpendicular bisection plane Z of the first black matrix 203a extending along the direction of the data line 102.

Embodiment 4

Figure 6:
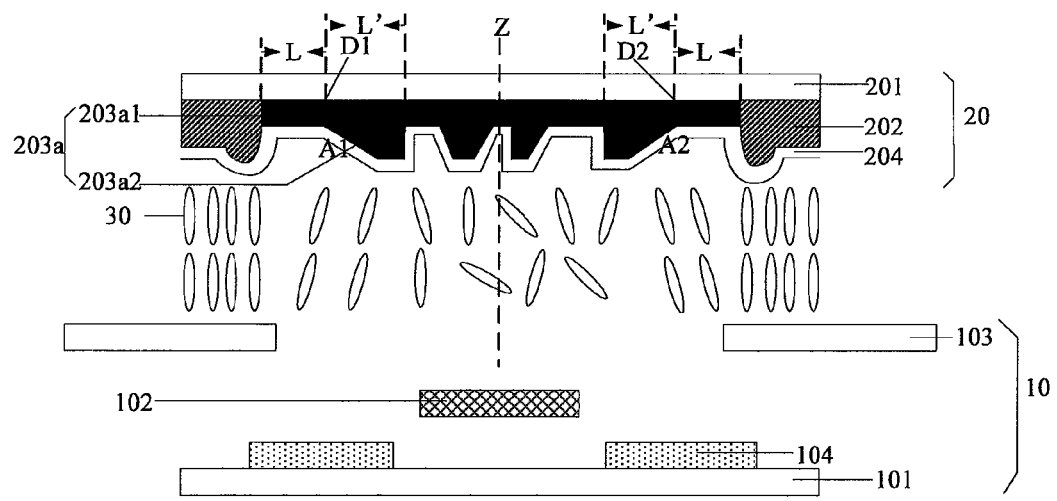
FIG. 6 schematically illustrate a cross section of a display panel after cell-assembling an array substrate and a color filter substrate provided by a fourth embodiment of the invention.

With reference to FIG. 6, the embodiment differs from the LCD panel of embodiment 1 in that the protrusion 203a2 of the embodiment comprises at least two trapezoidal sub-protrusions (such as four). Preferably, two of the four trapezoidal sub-protrusions that are closer to the boundary between the first black matrix 203a and the color resin 202 are symmetrical about the perpendicular bisection plane Z of the first black matrix 203a extending along the direction of the data line 102.

The two trapezoidal sub-protrusions that are closer to the boundary between the first black matrix 203a and the color resin 202 are the two trapezoidal sub-protrusions respectively comprising the two slant surfaces A1, A2 at the first positions D1, D2 and the two slant surfaces A1, A2 are the slant surfaces of the protrusion 203a2 that are closest to the boundary between the first black matrix 203a and the color resin 202.

As an example, a width L' of the contact region where the trapezoidal sub-protrusions that are closer to the boundary between the first black matrix 203a and the color resin 202 contacts with the flat bottom layer is preferably 0.9 μm~1.1 μm (the width used herein refers to a width of the contact region in the gate line-parallel direction of the array substrate 10), such that an electric field similar to those in the pixel region is effectively formed in the region near the slant surfaces to avoid light leakage.

Embodiment 5

Figure 7:
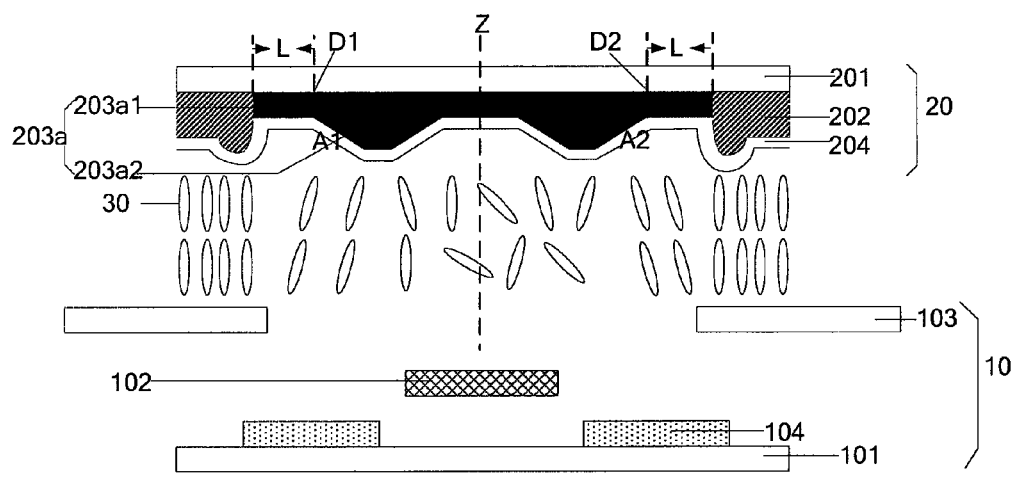
FIG. 7 schematically illustrate a cross section of a display panel after cell-assembling an array substrate and a color filter substrate provided by a fifth embodiment of the invention.

With reference to FIG. 7, the embodiment differs from the LCD panel of embodiment 1 in that the protrusion 203a2 of the embodiment comprises two trapezoidal sub-protrusions. In this case, the two trapezoidal sub-protrusions respectively comprise the two slant surfaces A1, A2 at the first positions D1, D2 and the two slant surfaces A1, A2 are the slant surfaces of the protrusion 203a2 that are closest to the boundary between the first black matrix 203a and the color resin 202. Meanwhile, the two trapezoidal sub-protrusions are symmetrical about the perpendicular bisection plane Z of the first black matrix 203a extending along the direction of the data line.

Preferably, as illustrated in FIG. 7, the two trapezoidal sub-protrusions respectively comprising the slant surfaces A1, A2 are both isosceles trapezoidal sub-protrusions.

Embodiment 6

This embodiment provides a display device comprising any of the afore-mentioned LCD panel.

As an example, the above display device may further comprise a backlight source disposed at an outside of the array substrate of the display panel.

The display device may be a LCD monitor, a LCD TV, a digital photoframe, a mobile phone, a tablet PC and any product or part having a display function.

In the LCD panel and the display device provided by the above embodiments, when the color filter substrate and the array substrate are misaligned, a strong electric field is generated between the common electrode overlaying the two slant surfaces of the first black matrix of the color filter substrate and the array substrate. The strong electric field is similar to the vertical electric field in the pixel region, and may cause the liquid crystal molecules at the edges of the black matrix in the non-pixel region to be in the same orientation as the liquid crystal molecules in the pixel region, such that light passing through the liquid crystal molecules at the edge of first black matrix in the non-pixel region is regulated, so as to overcome the light leakage issue caused by the misalignment between the color filter substrate and the array substrate, and improve the picture quality. Meanwhile, the amount of material of the black matrix is reduced.

What are described above is related to the illustrative embodiments of the disclosure only and not limitative to the scope of the disclosure; the scopes of the disclosure are defined by the accompanying claims.

What is claimed is:

1. A LCD panel comprising:
an array substrate which comprises: a first transparent substrate, a data line and a pixel electrode disposed on an inner side of the first transparent substrate;
a color filter substrate which comprises: a second transparent substrate comprising a pixel region and a non-pixel region, a color resin disposed in the pixel region, a first black matrix disposed in the non-pixel region and above the data line; and a common electrode overlaying the color resin and the first black matrix;
wherein the first black matrix comprises: a flat bottom layer and a protrusion formed on the flat bottom layer, the protrusion has slant surfaces near a boundary between the non-pixel region and the pixel region, such that an electric field for rotating liquid crystal molecules at edges of the first black matrix is generated between the common electrode overlaying the slant surfaces and the pixel electrode,
wherein the boundary between the non-pixel region and the pixel region is a boundary between the first black matrix and the color resin,
wherein the slant surfaces of the protrusions near the boundary between the first black matrix and the color resin are conjoined with the flat bottom layer at first positions, the slant surfaces incline, from the first positions, towards a perpendicular bisection plane of the first black matrix extending along the direction of the data line, and wherein distance between the first position and the boundary between the first black matrix and the color resin is 0.9 μm~1.1 μm.

2. The LCD panel of claim 1, wherein a height of the slant surface is 0.9 μm~1.1 μm.

3. The LCD panel of claim 1, wherein the protrusion comprises at least one trapezoidal sub-protrusion.

4. The LCD panel of claim 3, wherein the protrusion comprises one trapezoidal sub-protrusion and the trapezoidal sub-protrusion is symmetrical about the perpendicular bisection plane of the first black matrix extending along the direction of the data line.

5. The LCD panel of claim 3, wherein the protrusion comprises four trapezoidal sub-protrusions, and two of the four trapezoidal sub-protrusions that are closer to the boundary between the first black matrix and the color resin are symmetrical about the perpendicular bisection plane of the first black matrix extending along the direction of the data line.

6. A LCD panel comprising:
an array substrate which comprises: a first transparent substrate, a data line and a pixel electrode disposed on an inner side of the first transparent substrate;
a color filter substrate which comprises: a second transparent substrate comprising a pixel region and a non-pixel region, a color resin disposed in the pixel region, a first black matrix disposed in the non-pixel region and above the data line; and a common electrode overlaying the color resin and the first black matrix;
wherein the first black matrix comprises: a flat bottom layer and a protrusion formed on the flat bottom layer, the protrusion has slant surfaces near a boundary between the non-pixel region and the pixel region, such that an electric field for rotating liquid crystal molecules at edges of the first black matrix is generated between the common electrode overlaying the slant surface and the pixel electrode, wherein the protrusion comprises at least one trapezoidal sub-protrusion, wherein the protrusion comprises four trapezoidal sub-protrusions, and two of the four trapezoidal sub-protrusions that are closer to the boundary between the first black matrix and the color resin are symmetrical about the perpendicular bisection plane of the first black matrix extending along the direction of the data line, and wherein a width of the contact region where the two trapezoidal sub-protrusions that are closer to the boundary between the first black matrix and the color resin contacts with the flat bottom layer is 0.9 μm~1.1 μm.

7. The LCD panel of claim 3, wherein the protrusion comprises two trapezoidal sub-protrusions and the two trapezoidal sub-protrusions are symmetrical about the perpendicular bisection plane of the first black matrix extending along the direction of the data line.

8. The LCD panel of claim 7, wherein the trapezoidal sub-protrusions are isosceles trapezoidal sub-protrusions.

9. A display device comprising the LCD panel of claim 1 or 6.

10. The display device of claim 9, further comprising a backlight source disposed at an outside of the array substrate of the LCD panel.

* * * * *